Oct. 27, 1964 V. M. PETERS 3,154,149
INERTIA OPERATED BAILER DUMP VALVE
Filed Feb. 8, 1962 2 Sheets-Sheet 1
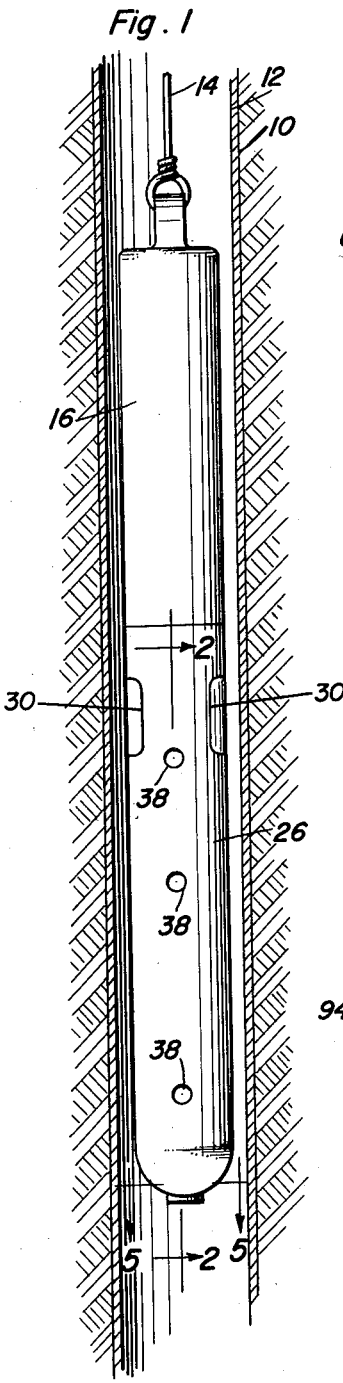
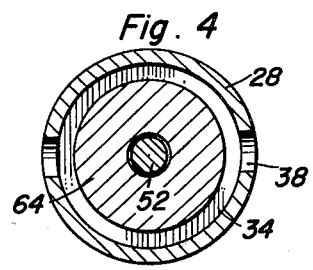
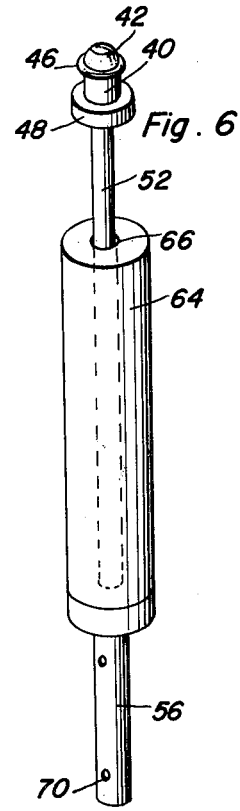
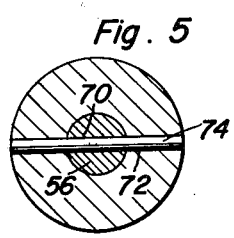
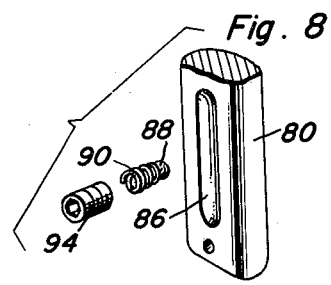
Vernon M. Peters
INVENTOR.
BY

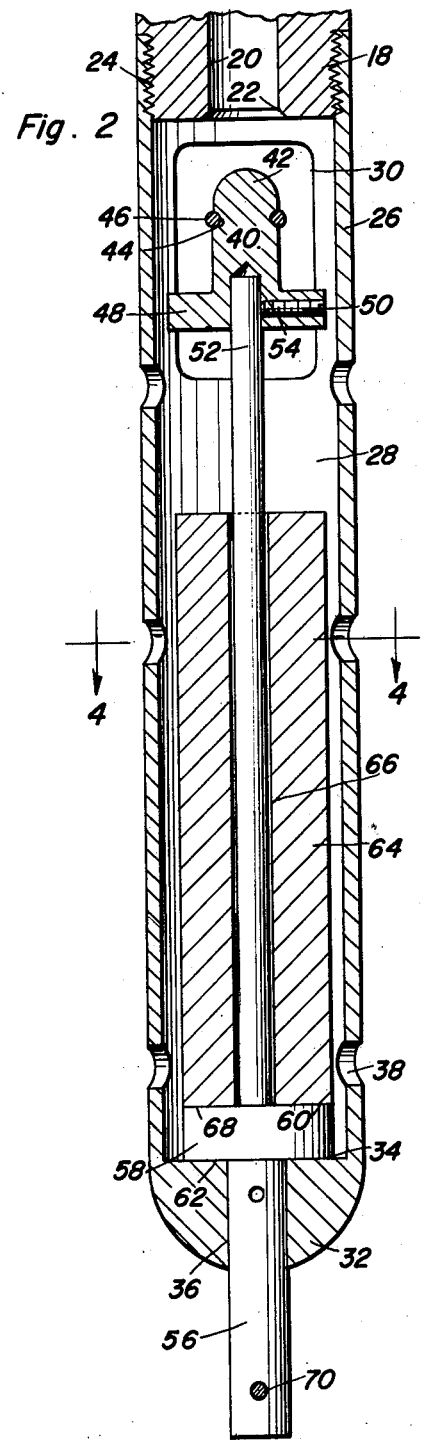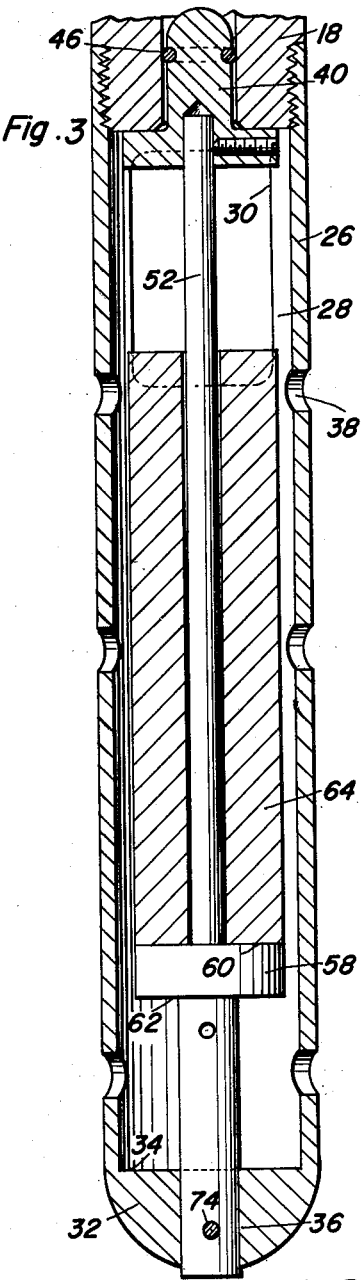
Vernon M. Peters
INVENTOR.

United States Patent Office 3,154,149
Patented Oct. 27, 1964

3,154,149
INERTIA OPERATED BAILER DUMP VALVE
Vernon M. Peters, P.O. Box 206, Welsh, La.
Filed Feb. 8, 1962, Ser. No. 171,881
11 Claims. (Cl. 166—169)

This invention comprises a novel and useful inertia operated bailer dump valve and more particularly pertains to a means for employing the effects of inertia in order to discharge the contents of a bailer by opening a discharge valve associated therewith.

The primary object of this invention is to provide a bailer having a dumping valve associated therewith in such a manner that the valve may be readily actuated to its open or discharge position through the application of controlled inertia thereto.

A further object of the invention is to provide a bailer dump valve construction particularly adapted for use with wire line operations for effecting sudden and quick raising and lowering of the tool or article carried thereby and which may be utilized to produce an inertia effect capable of actuating the dump valve of a bailer carried by the wire line.

A further object of the invention is to provide a bailer dump valve construction in accordance with the foregoing objects which will dependably and safely retain the bailer valve in closed position to prevent accidental discharge of the contents of the bailer and yet whereby in a simple manner and by normal manipulation of the wire line rig, the valve may be opened and the contents of the bailer discharged at a predetermined location in a well bore.

A still further and specific object of the invention is to provide a combined bailer and dump valve assembly including therein a jar or hammer potentially capable of effecting opening movement of the dump valve through its inertia and which is normally retained in an inoperative position until a shock of predetermined magnitude is applied to the wire line to which the bailer is attached.

A still further and specific object of the invention is to provide a bailer dump valve construction utilizing the effects of inertia to actuate the valve to its discharge position together with means resiliently and releasably retaining the valve in closed position until there is applied to the device a jar of predetermined magnitude and wherein the resilient valve closing force may be readily adjusted or regulated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in vertical section through a portion of a well bore showing a bailer attached to a wire line and having the dump valve construction of this invention applied thereto;

FIGURE 2 is a view in vertical central section taken upon an enlarged scale through the dump valve construction of the bailer substantially upon the plane indicated by the section line 2—2 of FIGURE 1 and showing the valve in its opened position for dumping the contents of the bailer;

FIGURE 3 is a view similar to FIGURE 2 but showing the position of the parts with the valve in its closed position prior to inertia actuation of the valve to its open position;

FIGURE 4 is a view in horizontal section taken substantially upon the plane indicated by the section line 4—4 of FIGURE 2;

FIGURE 5 is a further view in horizontal section taken substantially upon the plane indicated by the section line 5—5 of FIGURE 1;

FIGURE 6 is a perspective view, certain concealed parts being shown in dotted lines therein, of the valve and valve stem and the inertia hammer for actuating the valve in accordance with this invention;

FIGURE 7 is a view in horizontal section through a portion of a dump valve construction which is a modification in accordance with this invention; and FIGURE 8 is a perspective view of a portion of the valve stem and the valve closing means of FIGURE 7 in exploded relation.

Bailers are frequently employed in various operations in the working of wells for lowering chemicals or other agents or substances to a predetermined location in the well bore and then discharging this material at the desired location for various purposes which need not be here considered in detail. In such operations it is obviously highly important to provide means which will enable a precise control of the position at which the contents of the bailer are discharged and further which will effect the opening of the discharge valve of the bailer and discharging the contents by mechanism which is simple, dependable in operation, and will avoid the requirement for lengthy control lines or control equipment at the surface of the ground. In order to meet these requirements there has been provided a bailer and dump valve construction forming the subject matter of the invention set forth and claimed hereinafter.

Referring first to FIGURE 1, it will be observed that the numeral 10 indicates a well bore which may be provided with the usual well casing 12 and which extends to a region where it is desired to introduce certain chemicals or other materials with a controlled precision. Indicated by the numeral 14 is a conventional wire line comprising a means whereby a bailer body 16 of any conventional design may be lowered into the well to have its contents discharged. Inasmuch as the construction of a bailer itself and the wire line for operating the same is well understood by those skilled in the art, a further description of the same is deemed to be unnecessary for the purposes of the invention set forth and claimed.

Referring next to FIGURES 2 and 3 which show the bailer and dump valve construction upon an enlarged scale, it will be seen that the numeral 18 identifies the lower end of the bailer which in effect is a hollow chamber having a discharge opening 20 opening through its lower end and this opening in turn terminating in an annular recess 22 comprising a valve seat. The lower end 18 of the bailer body is diametrically reduced and threaded as shown at 24 for threadedly supporting thereon a depending sleeve-like housing 26 having a chamber 28 therein which is received the bailer dump valve and the valve actuating mechanism therefor. This housing 26 further includes suitable discharge opening or port 30 closely adjacent to the bailer discharge passage 20 so that the material carried by the bailer, when the valve is open, may be discharged therefrom through this port into the well casing 12.

At its lower end, the housing 26 preferably has a lower end wall or closure wall 32 having a flat annular surface 34 forming the bottom wall of the chamber 28 and having an axial bore 36 extending therethrough. Further, the housing 26 has a plurality of apertures or ports 38 extending through its side walls for the passage of well fluid therethrough to equalize pressures within and without the chamber.

Housed within and movable in the chamber 28 of the housing 26 is a dump valve assembly and actuator therefor the construction and operation of which forms an essential feature of this invention. Referring now to FIGURES 2 and 3 in conjunction with FIGURE 6 it will be observed that the dump valve consists of a generally cylindrical plunger-like body 40 having a hemispherical or smoothly rounded upper end or nose portion 42 which can be easily guided into the valve seat 22 for sliding movement in the bore 20. Intermediate its ends the external surface of the valve member or body 40 is provided with a circumferentially extending channel or groove 44 in which is received an O-ring 46 of any suitable material. This ring cooperates with the valve seat 22 to effect a fluid-tight seal therewith when the valve member 40 is in its raised position, thus completely blocking the discharge bore 20 of the bailer and retaining the contents in the bailer until such time as the valve is released from its seat.

At its lower end the valve member 40 is provided with a diametrically enlarged portion 48 comprising a flange or disk and in which is received a setscrew 50 by means of which the valve body is retained on the upper end of a valve stem or actuating rod 52. This rod is received in the lower end and is slidable in an axial bore 54 opening upwardly from the lower end of the valve as shown in FIGURES 2 and 3.

The valve stem 52 extends throughout the entire length of the chamber 28 and has its lower end diametrically enlarged as at 56 for a guided sliding action within the bore 36 in the end wall 32 of the housing 26. The enlarged portion 56 joins the main portion of the valve stem 52 by means of a diametrically enlarged disk or flange 58 having flat annular top and bottom surfaces 60 and 62, respectively. Freely slidable on the valve stem between the members 48 and 58 is a cylindrical body or weight 64 having an axial bore 66 therethrough of considerably greater diameter than that of the valve stem 52 whereby the body 64 is freely slidable upon the valve stem. The body 64 is likewise provided at its lower end with an annular flat surface 68 and there is further provided in the valve stem portion 56 a diametrical bore 70 which being registrable with a corresponding diametrical bore 72 in the end portion 32 of the housing 26 receives a shear pin 74 therethrough.

The member 64 is of sufficient weight to constitute a hammer or jar such that upon sudden relative movement of the jar upwardly and downwardly in the chamber 28 it contacts the upper surface 60 of the flange 58 on the valve stem which impact will be sufficient to break the shear pin 74 and allow the valve stem and the jar to move downwardly from the valve closing position of FIGURE 3 to the valve opening position of FIGURE 2. It will be observed by this movement the discharge passage 20 of the bailer is open so that the contents may flow therefrom through the ports 38 and 30 to the exterior of the bailer and valve assembly and into the well casing 12.

In order to minimize any damage to the device through the inertia or shock of the jar and valve member when they reach the end of their travel, it will be observed that there is provided a relatively large area of smooth surface contact between the surfaces 68 of the hammer and the surface 60 of the member 58, and between the surface 62 of the member 58 and the surface 34 at the bottom of the chamber 28.

As will be noted from FIGURE 5, the shear pin 74 extending through the diametrical bore 72 in the casing 26 and through the corresponding bore 70 of the valve stem portion 56 may be easily replaced when these bores are aligned by merely driving in a new pin and driving out the retained fragments of the previously sheared pin.

As will be understood, the embodiment of FIGURES 1–6 is a one-shot or single operation arrangement. Thus, once the bailer has discharged its contents in the well bore, it is necessary to remove the bailer from the well bore, reposition the valve in its closed position and then insert a new shear pin to retain the valve in closed position before the device can be again used.

A somewhat modified construction is shown in FIGURES 7 and 8. In this construction it is to be understood that the same construction of the valve and valve casing and valve port is employed as in the preceding embodiment. However, in place of the valve stem 52 which is of circular cross sectional area there is provided as shown in FIGURES 7 and 8 a valve stem 80 of a relatively flat cross sectional area which is slidably received in a corresponding bore or passage 82 within the lower end portion 84 of a valve casing corresponding to the casing 26. In this form, instead of a shear pin the valve stem 80 is provided with an axially elongated slot or depression 86 therein. Cooperating with this depression 86 is a detent ball 88 which is yieldingly urged and retained in this depression as by a compression spring 90 which is retained in a lateral bore 92 extending through the valve casing 84 by means of an adjusting setscrew 94. By this arrangement, the setscrew can be manipulated to vary the tension of the spring 90 and thus vary the force required to effect sliding movement of the stem 80 against the closing resistance of the detent ball 88.

The operation of both forms of the invention is identical. The wire line in the bailer attachment is lowered to the appropriate position in the well bore and is then raised a sufficient distance and allowed to drop freely being checked at the desired distance. The inertia or shock of the hammer 64 would shear the pin 74 in the form of FIGURES 1–5, or actuate the stem 80 against the holding action of the detent 88 in the embodiment of FIGURES 7 and 8, thus opening the valve 40. The opening or port 30 is of sufficient dimensions to provide access to the O-ring 46 for replacing same, if necessary.

In order to facilitate alignment of the bores in the members 32 and 56 for the insertion of the pin 74, complementary non-circular cross-sectional shapes may be given to the surfaces of the stem 56 and the bore 36.

Where a more precise and easier adjustment of the member 40 on the upper end of the stem 52 is desired, the contacting portions thereof may be threadedly engaged.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A dump bailer construction for wire line operation comprising a bailer having a discharge passage in its lower end, a dump valve casing secured to and supported by the bailer lower end and having a valve chamber communicating with said discharge passage, a dump valve in said chamber adapted to close said discharge passage to prevent flow therethrough and movable vertically between upper and lower positions respectively closing and opening said discharge passage, a discharge opening in said dump valve casing establishing unobstructed communication between said chamber and the exterior of said casing, a stem depending from said valve and including stop means thereon, retaining means engaging said stem and casing and retaining the former in passage closing position of said valve, inertia means including a weighted member having at least a portion thereof slidably embracing said valve stem and responsive to the inertia of a sudden stoppage of downward movement of said bailer on a wire line at a predetermined location for engaging said stop means and thereby releasing said retaining means and actuating said valve to its passage opening position.

2. The combination of claim 1 wherein said inertia means is disposed entirely within said valve chamber.

3. The combination of claim 1 wherein said inertia means comprises a weighted hollow sleeve loosely slidably surrounding said valve stem.

4. The combination of claim 1 wherein said retaining means comprises a shear pin disposed in registering bores in said stem and casing at the lower end of the latter.

5. The combination of claim 4 including guide means in the lower end of said casing guiding said stem against lateral movement.

6. The combination of claim 1 wherein said valve comprises a plunger having an exterior means providing a fluid tight sealed engagement with the wall of said discharge passage.

7. The combination of claim 6 wherein said bailer and plunger have cooperating guide surfaces facilitating entry of said plunger into said passage.

8. The combination of claim 7 wherein said plunger is removably secured to said stem.

9. The combination of claim 8 wherein said plunger and stem are solid members.

10. The combination of claim 1 wherein said retaining means comprises a recess in the side of said valve stem and a spring urged detent carried by said casing and releasably engaged in said recess.

11. The combination of claim 10 including a valve stem guide means in said casing and non-circular cooperating surfaces on said valve stem and guide means.

References Cited in the file of this patent
UNITED STATES PATENTS

| | | |
|---|---|---|
| 2,013,674 | Slocum | Sept. 10, 1935 |
| 2,141,179 | Ennis | Dec. 27, 1938 |
| 2,707,520 | Jordan | May 3, 1955 |
| 2,896,723 | Barnes | July 28, 1959 |